United States Patent
Kim et al.

(10) Patent No.: US 11,158,865 B2
(45) Date of Patent: Oct. 26, 2021

(54) CATHODE, LITHIUM-AIR BATTERY INCLUDING CATHODE AND METHOD OF MANUFACTURING LITHIUM-AIR BATTERY

(71) Applicant: Samsung Electronics Co., Ltd., Suwon-si (KR)

(72) Inventors: Hyunjin Kim, Seoul (KR); Wonsung Choi, Seoul (KR); Mokwon Kim, Suwon-si (KR); Seongheon Kim, Seongnam-si (KR); Dongmin Im, Seoul (KR); Kyounghwan Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 30 days.

(21) Appl. No.: 16/729,917

(22) Filed: Dec. 30, 2019

(65) Prior Publication Data
US 2020/0212451 A1 Jul. 2, 2020

(30) Foreign Application Priority Data

Jan. 2, 2019 (KR) .................. 10-2019-0000389

(51) Int. Cl.
*H01M 4/90* (2006.01)
*H01M 4/88* (2006.01)
*H01M 12/06* (2006.01)

(52) U.S. Cl.
CPC ....... *H01M 4/9016* (2013.01); *H01M 4/8892* (2013.01); *H01M 12/06* (2013.01); *H01M 2300/0065* (2013.01)

(58) Field of Classification Search
CPC .................................................. H01M 4/9016
See application file for complete search history.

(56) References Cited

U.S. PATENT DOCUMENTS

| | | | |
|---|---|---|---|
| 9,356,314 B2 | 5/2016 | Kim et al. | |
| 9,876,247 B2 | 1/2018 | Brown | |
| 9,966,628 B2 | 5/2018 | Schilm et al. | |
| 2005/0089754 A1* | 4/2005 | Lang ................... | H01M 50/403 429/185 |
| 2012/0295169 A1* | 11/2012 | Hosoe ................. | H01M 4/8803 429/405 |
| 2013/0084507 A1* | 4/2013 | Johnson .............. | H01M 8/1055 429/403 |
| 2013/0089796 A1* | 4/2013 | Sun ....................... | H01M 12/06 429/406 |
| 2017/0229742 A1* | 8/2017 | Aykol .................. | H01M 4/505 |
| 2017/0294671 A1 | 10/2017 | Jin et al. | |

FOREIGN PATENT DOCUMENTS

| | | | |
|---|---|---|---|
| CN | 108172903 | * | 6/2018 |
| JP | 5751589 B2 | | 5/2015 |
| KR | 101376595 B1 | | 3/2014 |
| KR | 1020170123727 A | | 11/2017 |

OTHER PUBLICATIONS

CN108172903 translation (Year: 2021).*
Girishkumar et al., "Lithium-Air Battery: Promise and Challenges", The Journal of Physical Chemistry Letters, 1, 2010, 2193-2203.

* cited by examiner

*Primary Examiner* — Brian R Ohara
(74) *Attorney, Agent, or Firm* — Cantor Colburn LLP

(57) ABSTRACT

A cathode configured to use oxygen as a cathode active material comprising a conductive layer including an electronic conductor, wherein the conductive layer is free of pores.

19 Claims, 17 Drawing Sheets

CATHODE, LITHIUM-AIR BATTERY INCLUDING CATHODE AND METHOD OF MANUFACTURING LITHIUM-AIR BATTERY

CROSS-REFERENCE TO RELATED APPLICATION

This application claims priority to and the benefit of Korean Patent Application No. 10-2019-0000389, filed on Jan. 2, 2019, in the Korean Intellectual Property Office, and all the benefits accruing therefrom under 35 U.S.C. § 119, the content of which is incorporated herein in its entirety by reference.

BACKGROUND

1. Field

The present disclosure relates to a cathode, a lithium-air battery including the cathode, and a method of manufacturing the lithium-air battery.

2. Description of the Related Art

In a lithium-air battery, lithium metal is used as an anode active material and it is unnecessary to store air as a cathode active material in the battery. Accordingly, a lithium-air battery may be manufactured as a high-capacity battery. Lithium-air batteries have a high theoretical specific energy of 3,500 watt hour per kilogram (Wh/kg) or greater, which is about ten times higher than that of lithium-ion batteries.

According to the related art, a cathode of a lithium-air battery may be manufactured by mixing a carbonaceous conducting agent, a binder, and the like. However, these cathode materials are understood to be easily decomposed by radicals generated from electrochemical reactions during charge and discharge of the lithium-air battery. Therefore, a lithium-air battery including such a cathode may be easily deteriorated, resulting in a reduced lifetime.

In a lithium-air battery, a cathode may have a structure with a triple-phase boundary in which lithium ions ($Li^+$), electrons ($e^-$), and oxygen ($O_2$) interact. The lithium-air battery may have poor discharge capacity due to limited reaction sites.

Therefore, there is a need for a cathode with improved lifetime characteristics and discharge capacity.

SUMMARY

Provided is a cathode with improved capacity characteristics.

Provided is a lithium-air battery including the cathode.

Provided is a method of manufacturing the lithium-air battery.

Additional aspects will be set forth in part in the description which follows and, in part, will be apparent from the description, or may be learned by practice of the presented embodiments.

According to an aspect of an embodiment, disclosed is a cathode oxygen as a cathode active material, the cathode including: a conductive layer including an electronic conductor, wherein the conductive layer is free of pores.

According to an aspect of another embodiment, a lithium-air battery includes: an anode including lithium or a lithium alloy; a solid electrolyte on the anode; and a cathode on the solid electrolyte, the cathode configured to use oxygen as a cathode active material and the cathode having a conductive layer including an electronic conductor, wherein the conductive layer is free of pores.

According to an aspect of another embodiment, a method of manufacturing a lithium-air battery includes: disposing a solid electrolyte layer on an anode including lithium or a lithium alloy; and coating an electronic conductor on a surface of the solid electrolyte layer opposite the anode to form a conductive layer free of pores to form a cathode configured to use oxygen as a cathode active material to manufacture the lithium-air battery.

Also disclosed is method of manufacturing a cathode, the method including: disposing an electronic conductor on a solid electrolyte to manufacture the cathode.

BRIEF DESCRIPTION OF THE DRAWINGS

The above advantages and other aspects of this disclosure will become apparent and more readily appreciated from the following description of the embodiments, taken in conjunction with the accompanying drawings in which.

DETAILED DESCRIPTION

Figure 1A:
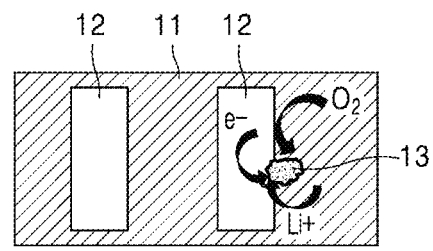
FIGS. 1A and 1B are schematic views for explaining a process of generation of a discharge product in a lithium-air battery.

Example embodiments of the present disclosure will now be described more fully with reference to the accompanying drawings, in which example embodiments are shown. However, this disclosure may be embodied in many different forms, should not be construed as being limited to the embodiments set forth herein, and should be construed as including all modifications, equivalents, and alternatives within the scope of the present disclosure; rather, these embodiments are provided so that this disclosure will be thorough and complete, and will fully convey the effects and features of the disclosure and ways to implement the disclosure to those skilled in the art.

The terminology used herein is for the purpose of describing particular embodiments only and is not intended to be limiting of the inventive concept. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the slash "/" or the term "and/or" includes any and all combinations of one or more of the associated listed items.

In the drawings, the size or thickness of each layer, region, or element are arbitrarily exaggerated or reduced for better understanding or ease of description, and thus the disclosure is not limited thereto. Throughout the written description and drawings, like reference numbers and labels will be used to denote like or similar elements. It will also be understood that when an element such as a layer, a film, a region or a component is referred to as being "on" another layer or element, it can be "directly on" the other layer or element, or intervening layers, regions, or components may also be present. Although the terms "first", "second", etc., may be used herein to describe various elements, components, regions, and/or layers, these elements, components, regions, and/or layers should not be limited by these terms. These terms are used only to distinguish one component from another, not for purposes of limitation. Thus, "a first element," "component," "region," "layer," or "section" discussed below could be termed a second element, component, region, layer, or section without departing from the teachings herein.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. It will also be understood that when an element such as a layer, a film, a region or a component is referred to as being "on" another layer or element, it can be "directly on" the other layer or element, or intervening layers, regions, or components may also be present. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of a cathode and a lithium-air battery including the cathode will be described in greater detail.

According to an aspect of the present disclosure, there is provided a cathode configured to use oxygen as a cathode active material, the cathode comprising: a conductive layer comprising an electronic conductor, wherein the conductive layer is free of pores.

As used herein, the expression "the conductive layer being free of pores" may mean that the conductive layer has a porosity of about 0.1 volume percent (vol %) or less, e.g., 0.1 vol % to 0 (zero) vol %, or about 0.1 vol % to about 0.001 vol %, for example, about less than 0.01 vol %, or about less than 0.001 vol %, based on a total volume of the conductive layer.

When the conductive layer is free of pores, reactions may occur at a two-phase interface between the conductive layer and oxygen ($O_2$) to which the conductive layer is exposed, and the number of reaction sites may be greatly increased.

The electronic conductor in the conductive layer may refer to a material having electronic conductivity.

In an embodiment, the electronic conductor may have lithium ion-conductivity. For example, the cathode including the electronic conductor may not need to further include an electrolyte, and lithium ions and electrons which are involved in generation of a discharge product during discharge of a lithium-air battery may be transferred through the electronic conductor of the cathode.

In an embodiment, the electronic conductor may have an electronic conductivity of about $1.0 \times 10^{-4}$ S/cm or greater. For example, the electronic conductor may have an electronic conductivity of about $2.0 \times 10^{-4}$ S/cm or greater, about $4.0 \times 10^{-4}$ S/cm or greater, about $5.0 \times 10^{-4}$ S/cm or greater, about $1.0 \times 10^{-3}$ S/cm or greater, about $2.0 \times 10^{-3}$ S/cm or greater, about $4.0 \times 10^{-3}$ S/cm or greater, about $5.0 \times 10^{-3}$ S/cm or greater, about $1.0 \times 10^{-2}$ S/cm or greater, or about $2.0 \times 10^{-2}$ S/cm or greater, or about 10 S/cm or greater, or about $10^2$ S/cm or greater, or about $10^4$ S/cm or greater, or about $10^6$ S/cm or greater. Due to the electronic conductor having such a high electronic conductivity, the cathode including the electronic conductor, and a lithium-air battery including the cathode may have reduced internal resistance.

For example, the electronic conductor may have an electronic conductivity of about $1.0 \times 10^{-4}$ S/cm to about $1.0 \times 10^3$ S/cm, about $2.0 \times 10^{-4}$ S/cm to about $1.0 \times 10^3$ S/cm, about $2.0 \times 10^{-4}$ S/cm to about $5.0 \times 10^2$ S/cm, about $4.0 \times 10^{-4}$ S/cm to about $5.0 \times 10^2$ S/cm, about $4.0 \times 10^{-4}$ S/cm to about $1.0 \times 10^2$ S/cm, about $5.0 \times 10^{-4}$ S/cm to about $1.0 \times 10^2$ S/cm, about $1.0 \times 10^{-3}$ S/cm to about $1.0 \times 10^2$ S/cm, about $2.0 \times 10^{-3}$ S/cm to about $1.0 \times 10^2$ S/cm, about $4.0 \times 10^{-3}$ S/cm to about $1.0 \times 10^2$ S/cm, about $5.0 \times 10^{-3}$ S/cm to about $1.0 \times 10^2$ S/cm, about $1.0 \times 10^{-2}$ S/cm to about $1.0 \times 10^2$ S/cm, about $2.0 \times 10^{-2}$ S/cm to about $1.0 \times 10^2$ S/cm, about $2.0 \times 10^{-2}$ S/cm to about $5.0 \times 10$ S/cm, or about $2.0 \times 10^{-2}$ S/cm to about $1.0 \times 10$ S/cm.

In an embodiment, the electronic conductor may have an ionic conductivity of about $1.0 \times 10^{-4}$ S/cm or greater. For example, the electronic conductor may have an ionic conductivity of about $2.0 \times 10^{-4}$ S/cm or greater, about $4.0 \times 10^{-4}$ S/cm or greater, about $5.0 \times 10^{-4}$ S/cm or greater, about $1.0 \times 10^{-3}$ S/cm or greater, about $2.0 \times 10^{-3}$ S/cm or greater, about $4.0 \times 10^{-3}$ S/cm or greater, about $5.0 \times 10^{-3}$ S/cm or greater, about $1.0 \times 10^{-2}$ S/cm or greater, or about $2.0 \times 10^{-2}$ S/cm or greater. Due to the electronic conductor having such a high ionic conductivity, the cathode including the electronic conductor, and a lithium-air battery including the cathode may have reduced internal resistance.

For example, the electronic conductor may have an ionic conductivity of about $1.0 \times 10^{-4}$ S/cm to about $1.0 \times 10^3$ S/cm, about $2.0 \times 10^{-4}$ S/cm to about $1.0 \times 10^3$ S/cm, about $2.0 \times 10^{-4}$ S/cm to about $5.0 \times 10^2$ S/cm, about $4.0 \times 10^{-4}$ S/cm to about $5.0 \times 10^2$ S/cm, about $4.0 \times 10^{-4}$ S/cm to about $1.0 \times 10^2$ S/cm, about $5.0 \times 10^{-4}$ S/cm to about $1.0 \times 10^2$ S/cm, about $1.0 \times 10^{-3}$ S/cm to about $1.0 \times 10^2$ S/cm, about $2.0 \times 10^{-3}$ S/cm to about $1.0 \times 10^2$ S/cm, about $4.0 \times 10^{-3}$ S/cm to about $1.0 \times 10^2$ S/cm, about $5.0 \times 10^{-3}$ S/cm to about $1.0 \times 10^2$ S/cm, about $1.0 \times 10^{-2}$ S/cm to about $1.0 \times 10^2$ S/cm, about $2.0 \times 10^{-2}$ S/cm to about $1.0 \times 10^2$ S/cm, about $2.0 \times 10^{-2}$ S/cm to about $5.0 \times 10$ S/cm, or about $2.0 \times 10^{-2}$ S/cm to about $1.0 \times 10$ S/cm.

In an embodiment, the electronic conductor may provide both ionic conductivity and electronic conductivity at the same time, and thus a cathode may be implemented without using an additional conducting agent and an electrolyte.

In an embodiment, the electronic conductor is not specifically limited and may be any suitable material with suitable electronic conductivity, for example, an inorganic electronic conductor.

In an embodiment, the electronic conductor may be a metal, a metal oxide, or a mixture thereof. For example, the electronic conductor may be a metal.

For example, the electronic conductor may be at least one of Ni, Pd, Pb, Fe, Ir, Co, Rh, Mn, Cr, Ru, Re, Sn, V, Ge, W, Zr, Ti, Mo, Hf, U, Nb, Th, Ta, Bi, Na, K, Rb, Cs, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, or Pb, or an oxide thereof. For example, the electronic conductor may include at least one oxide of Ni, Pd, Pb, Fe, Ir, Co, Rh, Mn, Cr, Ru, Re, Sn, V, Ge, W, Zr, Ti, Mo, Hf, U, Nb, Th, Ta, Bi, Na, K, Rb, Cs, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, or Pb. For example, the electronic conductor may be at least one of Ni, Pd, Pb, Fe, Ir, Co, Rh, Mn, Cr, Ru, Re, Sn, V, Ge, W, Zr, Ti, Mo, Hf, U, Nb, Th, Ta, Bi, Na, K, Rb, Cs, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Au, or Pb. For example, the electronic conductor may be an oxide of at least one of Ni, Pd, Pb, Fe, Ir, Co, Rh, Mn, Cr, Ru, Re, Sn, V, Ge, W, Zr, Ti, Mo, Hf, U, Nb, Th, Ta, Bi, Na, K, Rb, Cs, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Au, or Pb.

In an embodiment, the conductive layer may have a thickness of about 3 nanometers (nm) to about 100 nm. In an embodiment, the conductive layer may have a thickness of about 3 nm to about 90 nm, for example, about 3 nm to about 50 nm, for example, about 3 nm to about 30 nm, or for example, about 5 nm to about 30 nm.

When the thickness of the conductive layer is not within these ranges, for example, less than 3 nm, a lithium-air electrode including the conductive layer may have reduced conductivity. When the thickness of the conductive layer exceeds 100 nm, a lithium-air battery may have reduced capacity characteristics, and it may be difficult for lithium ions to pass through the conductive layer, thus reducing generation of a discharge product.

According to another aspect of the present disclosure, a lithium-air battery comprises: an anode including lithium or a lithium alloy; a solid electrolyte on the anode; and a cathode on the solid electrolyte, the cathode configured to use oxygen as a cathode active material, the cathode comprising an electronic conductor, wherein the conductive layer is free of pores.

The above detailed descriptions of the electronic conductor and the conductive layer may apply to those in the lithium-air battery.

In an embodiment, the conductive layer may be of a form in which the electronic conductor is coated on an entire surface of the solid electrolyte, wherein the conductive layer is free of pores.

By the use of the cathode having the conductive layer which is free of pores as described above, the lithium-air battery may have improved structural stability and improved capacity characteristics and lifetime characteristics.

In an embodiment, a discharge product may be generated on a surface of the cathode when the lithium-air battery is discharged. The discharge product may be generated at an interface between the cathode and oxygen, and not in a 3-phase interface between the cathode, the solid electrolyte, and oxygen. While not wanting to be bound by theory, it is understood that this is attributed to efficient conduction of lithium ions and electrons through the cathode including a lithium alloy.

Figure 1B:
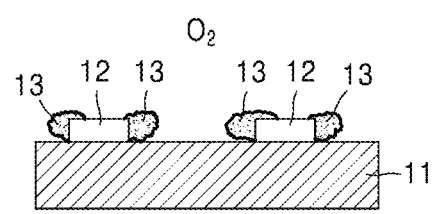
Figure 1C:
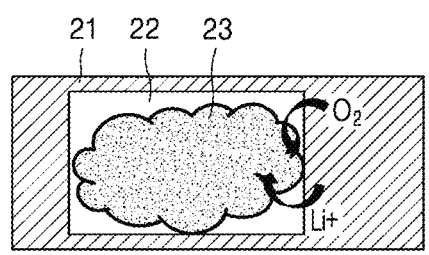
FIGS. 1C and 1D are schematic views for explaining a process of generation of a discharge product in a lithium-air battery according to an embodiment of the disclosure.
Figure 1D:
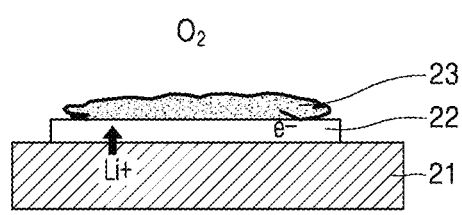

FIGS. 1A and 1B are schematic views for explaining a process of generation of a discharge product in a lithium-air battery. FIGS. 1C and 1D are schematic views for explaining a process of generation of a discharge product in a lithium-air battery according to an embodiment of the disclosure.

Referring to FIGS. 1A and 1B, in a lithium-air battery, a cathode 12 on an electrolyte layer 11 may include pores for transfer of lithium ions, and when the lithium-air battery is discharged, a discharge product 13 may be generated at a three-phase interface of the electrolyte layer 11, the cathode 12, and air, e.g., at relatively restricted sites.

Referring to FIGS. 1C and 1D, in a lithium-air battery according to an embodiment, a cathode 22 without pores may be located on an electrolyte layer 21, and when the lithium-air battery is discharged, a discharge product 23 may be generated at a two-phase interface of the cathode 22 and air, e.g., over an entire surface of the cathode 22.

In the lithium-air battery according to an embodiment, the discharge product may not be present on the surface of the cathode when the lithium-air battery is recharged after discharging.

In an embodiment, an area of the surface of the cathode in which the discharge product is generated may be about 90 percent (%) to 100% of a total surface area of the cathode. The discharge product may be generated over substantially the entire surface of the cathode. This is attributed to the reaction that occurs at the surface of the conductive layer of the cathode. Due to the generation of the discharge product over the entire surface of the cathode, the cathode may have increased energy density, and the lithium-air battery including the cathode may have increased discharge capacity due to an increased reaction area, and may also be easily charged.

For example, the area of the surface of the cathode in which the discharge product is generated may be about 95% or greater, about 96% or greater, about 97% or greater, about 98% or greater, about 99% or greater, about 99.5% or greater, about 99.9% or greater, based on the total surface area of the cathode.

In an embodiment, the discharge product generated on the surface of the cathode when the lithium-air battery is discharged may be at least one of lithium oxide, a lithium peroxide, a lithium hydroxide, or a lithium carbonate. For example, the discharge product may be at least one of $Li_2O_2$, $LiOH$, $Li_2CO_3$, or $Li_2O$. However, the embodiment is not limited thereto.

In an embodiment, the lithium-air battery may include the cathode according to the above-described embodiment. The cathode may be an air electrode.

The cathode may include the conductive layer according to the above-described embodiment. In an embodiment, an amount of the conductive layer may be about 1 part by weight to about 100 parts by weight, for example, about 10 parts by weight to about 100 parts by weight, for example, about 50 parts by weight to about 100 parts by weight, for example, about 60 parts by weight to about 100 parts by weight, for example, about 70 parts by weight to about 100 parts by weight, for example, about 80 parts by weight to about 100 parts by weight, or for example, about 90 parts by weight to about 100 parts by weight, each with respect to 100 parts by weight of a total weight of the cathode. For example, the cathode may substantially consist of the conductive layer according to the embodiment. The cathode may be obtained by coating an electronic conductor as described above on an entire surface of the solid electrolyte, and may substantially consist of the conductive layer including the electronic conductor.

The cathode may be manufactured without using a pore-forming agent, such that no pores are formed in the cathode. The cathode may be, for example, in a sheet form. However, the embodiment is not limited thereto. The cathode may have any suitable shape according to a type of the battery. The cathode may be non-porous. The cathode may have porosity of 0% to about 0.001%, about 0.001% to about 0.1%, or about 0.01% to about 0.1%, based on a total volume of the cathode.

The cathode may substantially consist of the conductive layer, and a solid lithium-ion electrolyte directly on the electronic conductor, according to the embodiment. Accordingly, the cathode may have a simplified structure, and it may also become easier to manufacture the cathode. Due to easy migration of lithium ions and/or electrons through the conductive layer of the cathode, electrochemical reactions involving oxygen, lithium ions, and electrons may easily occur on the surface of the cathode.

In an embodiment, the cathode may further include a catalyst for oxidation/reduction of oxygen. The catalyst may include: at least one of a metal-based catalyst, such as a catalyst comprising at least one of platinum, gold, silver, palladium, ruthenium, rhodium, or osmium; an oxide-based catalyst, such as at least one of manganese oxide, iron oxide, cobalt oxide, or nickel oxide; or an organic metal-based catalyst, such as cobalt phthalocyanine. However, the embodiment is not limited thereto. Any suitable catalyst for oxidation/reduction of oxygen used in the art may be used.

The lithium-air battery according to an embodiment may include an anode as described above. The anode may include lithium.

In an embodiment, the anode may be a lithium metal thin film or a lithium-based alloy thin film. In an exemplary embodiment, the lithium-based alloy may be a lithium alloy comprising, for example, at least one of aluminum, tin, magnesium, indium, calcium, titanium, or vanadium.

The lithium-air battery according to an embodiment may include a solid electrolyte between the cathode and the anode as described above.

In an embodiment, the solid electrolyte may include at least one of a solid electrolyte including an ionically conducting inorganic material, a solid electrolyte including a polymeric ionic liquid (PIL) and a lithium salt, a solid electrolyte including an ionically conducting polymer and a lithium salt, or a solid electrolyte including an electronically conducting polymer. However, the disclosed embodiment is not limited thereto. Any suitable solid electrolyte available in the art may be used For example, the ionically conducting inorganic material may include at least one of a glass or an amorphous metal-ion conductor, a ceramic metal-ion conductor, or a glass ceramic metal-ion conductor. However, the disclosed embodiment is not limited thereto. Any suitable ionically conducting inorganic material available in the art may be used. In an embodiment, the ionically conducting inorganic material may be an ionically conducting inorganic particles, or a molded product thereof, and may have, for example, a sheet form.

For example, the ionically conducting inorganic material may be at least one of $BaTiO_3$, $Pb(Zr_xTi_{1-x})O_3$ wherein $0 \leq x \leq 1$ (PZT), $Pb_{1-x}La_xZr_{1-y}Ti_yO_3$ (PLZT, wherein $0 \leq x' < 1 < 1$ and $0 \leq y' < 1$), $Pb(Mg_3Nb_{2/3})O_3$—$PbTiO_3$(PMN—PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate ($Li_3PO_4$), lithium titanium phosphate ($Li_{x'}Ti_{y'}(PO_4)_3$, wherein $0 < x' < 2$ and $0 < y' < 3$), lithium aluminum titanium phosphate ($Li_{x'}Al_{y'}Ti_{z'}(PO_4)_3$, wherein $0 < x' < 2$, $0 < y' < 1$, and $0 < z' < 3$), $Li_{1+x'+y'}(Al_aGa_{1-a})_{x'}(Ti_bGe_{1-b})_{2-x'}Si_{y'}P_{3-y'}O_{12}$ (wherein $0 \leq a \leq 1$, $0 \leq b \leq 1$, $0 \leq x' \leq 1$ and $0 \leq y' \leq 1$), lithium lanthanum titanate ($Li_xLa_yTiO_3$, wherein $0 < x' < 2$ and $0 < y' < 3$), lithium germanium thio phosphate ($Li_{x'}Ge_{y'}P_{z'}S_{w'}$, wherein $0 < x' < 4$, $0 < y' < 1$, $0 < z' < 1$, and $0 < w' < 5$), lithium nitride ($Li_{x'}N_{y'}$, wherein $0 < x' < 4$ and $0 < y' < 2$), a $SiS_2$-based glass ($Li_{x'}Si_{y'}S_{z'}$, wherein $0 < x' < 3$, $0 < y' < 2$, and $0 < z' < 4$), a $P_2S_5$-based glass ($Li_{x'}P_{y'}S_{z'}$, wherein $0 < x' < 3$, $0 < y' < 3$, and $0 < z' < 7$), $Li_2O$, $LiF$, $LiOH$, $Li_2CO_3$, $LiAlO_2$, or a $Li_2O$—$Al_2O_3$—$SiO_2$—$P_2O_5$—$TiO_2$—$GeO_2$-based ceramic, or a garnet-based ceramic such as $Li_{3+x}La_3M_2O_{12}$, wherein M is Te, Nb, or Zr, and $0 \leq x' \leq 1$.

In an embodiment, the solid electrolyte may include a lithium-ion conducting material, such as, a lithium-ion conducting glass, a crystalline lithium-ion conducting ceramics, or a crystalline lithium-ion conducting glass-ceramics), or a mixture thereof. To improve chemical stability, the solid electrolyte may include an oxide. When the solid electrolyte includes a large amount of lithium-ion conducting crystals, improved ionic conductivity may be obtained. For example, the amount of the lithium-ion conducting material may be about 50 wt % or greater, 55 wt % or greater, or about 60 wt % or greater, based on a total weight of the solid electrolyte, for example, about 50 wt % to about 60 wt %, about 55 wt % to about 70 wt %. In an embodiment, the lithium-ion conducting crystals may be crystals having a perovskite structure with lithium-ion conductivity, for example, $Li_3N$, LISICON, or $La_{0.55}Li_{0.35}TiO_3$; $LiTi_2P_3O_{12}$ having a NASICON-type structure; or glass-ceramics which can precipitate these crystals. In an embodiment, the lithium-ion conducting crystals may be $Li_{1+x+y}(Al_aGa_{1-a})_x(Ti_bGe_{1-b})_{2-x}Si_yP_{3-y}O_{12}$ (wherein $0 \leq x \leq 1$, $0 \leq y \leq 1$, $0 \leq a \leq 1$, and $0 \leq b \leq 1$, for example, $0 \leq x \leq 0.4$ and $0 < y \leq 0.6$, or $0.1 \leq x \leq 0.3$ and $0.1 < y \leq 0.4$). To have improved ionic conductivity, the crystalline lithium-ion conducting material may not contain a grain boundary that may interrupt ionic conduction. For example, the glass-ceramics have nearly no porosity or a grain boundary which could interrupts ionic conduction, and may have high ionic conductivity and good chemical stability. For example, the lithium-ion conducting glass-ceramic may be at least one of lithium-aluminum-germanium-phosphate (LAGP), lithium-aluminum-titanium-phosphate (LATP), or lithium-aluminum-titanium-silicon-phosphate (LATSP). For example, when a parent glass having the composition of $Li_2$)—$Al_2O_3$—$TiO_2$—$SiO_2$—$P_2O_5$ is crystallized by thermal treatment, the resulting crystalline phase may be $Li_{1+x+y}Al_xTi_{2-x}Si_yP_{3-y}O_{12}$ (wherein $0 \leq x \leq 2$ and $0 \leq y \leq 3$). In an embodiment, in the formula of $Li_{1+x+y}Al_xTi_{2-x}Si_yP_{3-y}O_{12}$, x and y may satisfy that, for example, $0 \leq x \leq 0.4$ and $0 < y \leq 0.6$; or $0.1 \leq x \leq 0.3$ and $0.1 < y \leq 0.4$. Pores or grain boundaries which interrupt ionic conduction may refer to an ionic conduction-interrupting material such as pores or grain boundaries that reduces a total conductivity of an inorganic material including lithium-ion conducting crystals to a level of one-tenth ($\frac{1}{10}$) or less of the conductivity of only the lithium-ion conducting crystals in the inorganic material.

In an embodiment, the solid electrolyte may include at least one of lithium-aluminum-germanium-phosphate (LAGP), lithium-aluminum-titanium-phosphate (LATP), or lithium-aluminum-titanium-silicon-phosphate (LATSP).

For example, the polymeric ionic liquid (PIL) may include a repeating unit including: i) a cation of at least one of an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, or a triazolium cation; and ii) at least one anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $AsF_6^-$, $SbF_6^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2PO^-$, or $N(CF_3SO_2)_2^-$.

For example, the polymeric ionic liquid (PIL) may be at least one of poly(diallyldimethylammonium) bis(trifluoromethanesulfonyl)imide) (TFSI), poly(1-allyl-3-methylimidazolium bis(trifluoromethanesulfonyl)imide), or poly ((N-methyl-N-propylpiperidinium bis (trifluoromethanesulfonyl)imide.

For example, the ionically conducting polymer may include an ion conductive repeating unit, and the ion conductive repeating unit may be at least one of an ether-based monomer, an acryl-based monomer, a methacryl-based monomer, or a siloxane-based monomer.

In an embodiment, the ionically conducting polymer may include, for example, at least one of polyethylene oxide (PEO), polyvinyl alcohol (PVA), polyvinyl pyrrolidone (PVP), polyvinyl sulfone, polypropylene oxide (PPO), polymethylmethacrylate, polyethylmethacrylate, polydimethylsiloxane, polyacrylic acid, polymethacrylic acid, poly (methyl acrylate), poly(ethyl acrylate), poly(2-ethylhexyl acrylate), poly(butyl methacrylate), poly(2-ethylhexyl methacrylate), poly(decyl acrylate), polyethylene vinyl acetate, a phosphate ester polymer, polyester sulfide, polyvinylidene fluoride (PVdF), or a Li-substituted Nafion. However, the embodiment is not limited thereto. Any suitable ionically conducting polymer available in the art may be used.

For example, the electronically conducting polymer may be a polyphenylene derivative or a polythiophene derivative. However, the embodiment is not limited thereto. Any suitable electronically conducting polymer available in the art may be used.

In an embodiment, the lithium-air battery may further include a gel electrolyte. The gel electrolyte may be obtained by, for example adding a low-molecular weight solvent to the solid electrolyte interposed between the cathode and the anode. The gel electrolyte may be a gel electrolyte obtained by adding a low-molecular weight organic compound such as a solvent, an oligomer, or the like to a polymer. The gel electrolyte may be a gel electrolyte obtained by adding a low-molecular weight organic compound such as a solvent or an oligomer to any of the suitable polymer.

In an embodiment, the lithium-air battery may further include a liquid electrolyte. The liquid electrolyte may include a solvent and a lithium salt. The solvent may include at least one of an organic solvent, an ionic liquid (IL), or an oligomer. However, the embodiment is not limited thereto.

Any suitable solvent available in the art that is in liquid form at room temperature (25° C.) may be used.

For example, the organic solvent may include at least one of an ether-based solvent, a carbonate-based solvent, an ester-based solvent, and a ketone-based solvent. For example, the organic solvent may include at least one of propylene carbonate, ethylene carbonate, fluoroethylene carbonate, vinylethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, dimethyl acetamide, dimethylsulfoxide, dioxane, 1,2-dimethoxyethane, sulfolane, dichloroethane, chlorobenzene, nitrobenzene, succinonitrile, diethylene glycol dimethyl ether (DEGDME), tetraethylene glycol dimethyl ether (TEGDME), polyethylene glycol dimethyl ether (PEGDME, Molecular Weight (Mn)=~500), dimethyl ether, diethyl ether, dibutyl ether, dimethoxyethane, 2-methyltetrahydrofuran, or tetrahydrofuran. However, the embodiment is not limited thereto. The organic solvent may be any suitable organic solvent available in the art that is in liquid form at room temperature.

For example, the ionic liquid (IL) may include: i) at least one cation selected from an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, or a triazolium-based cation, and ii) at least one anion of $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $Cl^-$, $Br^-$, $I^-$, $BF_4^-$, $SO_4^-$, $PF_6^-$, $ClO_4^-$, $CF_3SO_3^-$, $CF_3CO_2^-$, $(C_2F_5SO_2)_2N^-$, $(C_2F_5SO_2)(CF_3SO_2)N^-$, $NO_3^-$, $Al_2Cl_7^-$, $AsF_6^-$, $SbF_6^-$, $CF_3COO^-$, $CH_3COO^-$, $CF_3SO_3^-$, $(CF_3SO_2)_3C^-$, $(CF_3CF_2SO_2)_2N^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2PO^-$, or $N(CF_3SO_2)_2^-$.

For example, the lithium salt may include at least one of lithium bis(trifluoromethanesulfonyl)imide (LiTFSI), $LiPF_6$, $LiBF_4$, $LiAsF_6$, $LiClO_4$, $LiNO_3$, lithium bis(oxalato) borate (LiBOB), $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, or lithium trifluoromethanesulfonate (LiTfO). However, the embodiment is not limited thereto. Any suitable material available as a lithium salt in the art may be used. A concentration of the lithium salt may be, for example, about 0.01 molar (M) to about 5.0 M.

In an embodiment, the lithium-air battery may further include a separator between the cathode and the anode. Any suitable separator may be used as long as being durable under operation conditions of the lithium-air battery. In an embodiment, the separator may include a polymer nonwoven fabric, for example, a non-woven fabric of polypropylene material or a non-woven fabric of polyphenylene sulfide; a porous film of an olefin resin such as polyethylene or polypropylene; or glass fiber. These separators may be used in a combination of at least two thereof.

In an embodiment, the electrolyte layer may have a structure in which a solid polymer electrolyte is impregnated in the separator, or a structure in which a liquid electrolyte is impregnated in the separator. For example, the electrolyte layer in which a solid polymer electrolyte is impregnated in the separator may be prepared by arranging solid polymer electrolyte films on opposite surfaces of the separator, and roll-pressing them at the same time. For example, the electrolyte layer in which a liquid electrolyte is impregnated in the separator may be prepared by injecting a liquid electrolyte including a lithium salt into the separator.

In an embodiment, the lithium-air battery may have a discharge capacity of about 5 milliamp hour (mAh) to about 60 mAh after being discharged until a voltage of 2.0 V (with respect to Li) is reached.

According to another aspect of the present disclosure, a method of manufacturing a lithium-air battery includes: disposing a solid electrolyte layer on an anode including lithium or a lithium alloy; and coating an electronic conductor on a surface, e.g., an entire surface, of the solid electrolyte layer opposite the anode to form a conductive layer free of pores to form a cathode configured to use oxygen as a cathode active material to manufacture the lithium-air battery.

The above-detailed descriptions of the electronic conductor, the conductive layer, the cathode, the solid electrolyte (layer), and the anode may apply to those of the lithium-air battery manufactured by the method according to an embodiment. The expression "coating the electronic conductor on an entire surface of the solid electrolyte layer" may mean coating the electronic conductor on the entire surface of the solid electrolyte layer such that no pores are incorporated.

The coating may be performed by a method, for example, sputtering, atomic layer deposition (ALD), or the like.

In an embodiment, the conductive layer may be free of pores.

Any suitable electrochemical method of doping lithium available in the art may be used without limitation. However, the embodiment is not limited thereto. The lithium-air battery according to an embodiment may be manufactured using any suitable method known in the art.

In an embodiment, the lithium-air battery may be manufactured by installing the anode on an inner side of a case, sequentially arranging the electrolyte layer on the anode, the cathode on the electrolyte layer, and a cathode current collector on the cathode, and then arranging a pressing member, which allows air to be transferred to the air electrode (e.g., cathode), on the cathode current collector to fix a resulting cell structure, thereby completing the manufacture of the lithium-air battery. The case may be divided into upper and lower portions which contact the anode and the air electrode, respectively. An insulating resin may be disposed between the upper and lower portions of the case to electrically insulate the cathode and the anode from one another.

The lithium-air battery according to the embodiment may be used as any of a lithium primary battery and a lithium secondary battery. The lithium-air battery may have any suitable shape of, for example, a coin, a button, a sheet, a stack, a cylinder, a plane, or a horn. However, the embodiment is not limited thereto. The lithium-air battery may be used in a large battery for electric vehicles.

Figure 10:
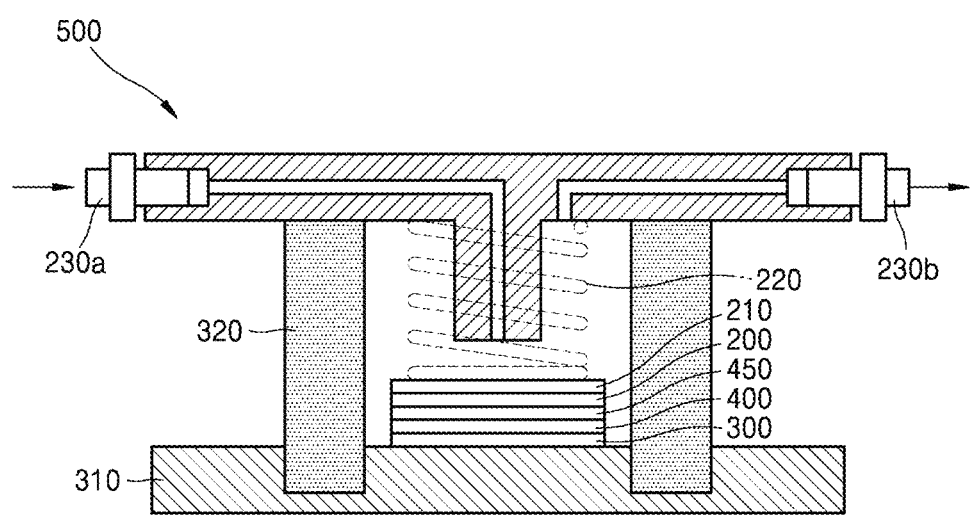
FIG. 10 is a schematic view illustrating a structure of a lithium-air battery according to an embodiment.

FIG. 10 is a schematic view illustrating a structure of a lithium-air battery 500 according to an embodiment. Referring to FIG. 10, the lithium-air battery 500 according to an embodiment may include a cathode 200 adjacent to a first current collector 210 and configured to use oxygen as an active material, an anode 300 adjacent to a second current collector 310 and including lithium, and a first electrolyte layer 400 interposed between the cathode 200 and the anode 300. The first electrolyte layer 400 may be a separator impregnated with a liquid electrolyte. A second electrolyte layer 450 may be arranged between the cathode 200 and the first electrolyte layer 400. The second electrolyte layer 450 may be a lithium-ion conductive solid electrolyte membrane. The first current collector 210 may be porous and function as a gas diffusion layer which allows diffusion of air. A pressing member 220 for transporting air to the cathode 200 may be arranged on the first current collector 210. A case 320 made of an insulating resin may be disposed between the cathode 200 and the anode 300 to electrically insulate the cathode 200 and the anode 300 from one another. The air may be supplied into the lithium-air battery 500 through an air inlet 230$a$ and may be discharged through an air outlet 230$b$. The lithium-air battery 500 may be accommodated in a stainless steel container.

The term "air" used herein is not limited to atmospheric air, and for convenience, may refer to a combination of gases including oxygen, or pure oxygen gas. This broad definition of the term "air" also applies to any other terms used herein, including "air battery" and "air electrode."

One or more embodiments of the present disclosure will now be described in detail with reference to the following examples. However, these examples are only for illustrative purposes and are not intended to limit the scope of the one or more embodiments of the present disclosure.

EXAMPLES

Manufacture of Lithium-Air Battery

Example 1: Manufacture of Lithium-Air Battery Cathode/LATP/PEGDME/Li Anode

A polymer electrolyte as an anode intermediate layer was arranged on a lithium metal foil (having a thickness of about 10 millimeters (mm), Ohara Corp., Japan) used as an anode. The polymer electrolyte was prepared by mixing polyethylene glycol dimethyl ether (PEGDME) (Mn=100,000 Daltons, Celgard) with lithium bis(trifluoromethylsulonly)imide (LiTFSI) used as a lithium salt in a molar ratio of PEGDME/LiTFSI of 20:1.

A lithium aluminum titanium phosphate (LATP) layer (having a thickness of about 20 mm, Ohara Corp., Japan) as a solid electrolyte layer was arranged on the polymer electrolyte.

Gold (Au) metal was coated on an entire surface of the solid electrolyte layer to a thickness of about 5 nanometers (nm) by sputtering to form an Au conductive layer free of pores.

After a gas diffusion layer (GDL, 25BC, available from SGL) was arranged on the cathode, and then a nickel mesh was arranged on the gas diffusion layer, a resulting cell structure was pressed and fixed with a pressing member to allow transfer of air to the cathode, thereby manufacturing a lithium-air battery.

Example 2

A lithium-air battery was manufactured in the same manner as in Example 1, except that the Au metal was coated to a thickness of about 7.5 nm.

Example 3

A lithium-air battery was manufactured in the same manner as in Example 1, except that the Au metal was coated to a thickness of about 30 nm.

Example 4

A lithium-air battery was manufactured in the same manner as in Example 1, except that the Au metal was coated to a thickness of about 90 nm.

Comparative Example 1

A lithium-air battery was manufactured in the same manner as in Example 1, except that the Au metal was not coated.

Comparative Example 2

A lithium-air battery was manufactured in the same manner as in Example 1, except that the Au metal was coated to a thickness of about 7.5 nm and a pore-forming agent was added to form pores.

Evaluation Example 1

After the lithium-air batteries manufactured in Examples 1 to 3 and Comparative Example 1 were each discharged at about 60° C. under a 1 atmosphere (atm) of oxygen with a constant current of 0.01 milliampere per square centimeter (mA/cm$^2$) until a voltage of 2.0 V (with respect to Li) was reached, discharge capacities and discharge capacities with respect to the cathodes were evaluated. The results are shown in FIGS. 2A and 2B.

Figure 2A:
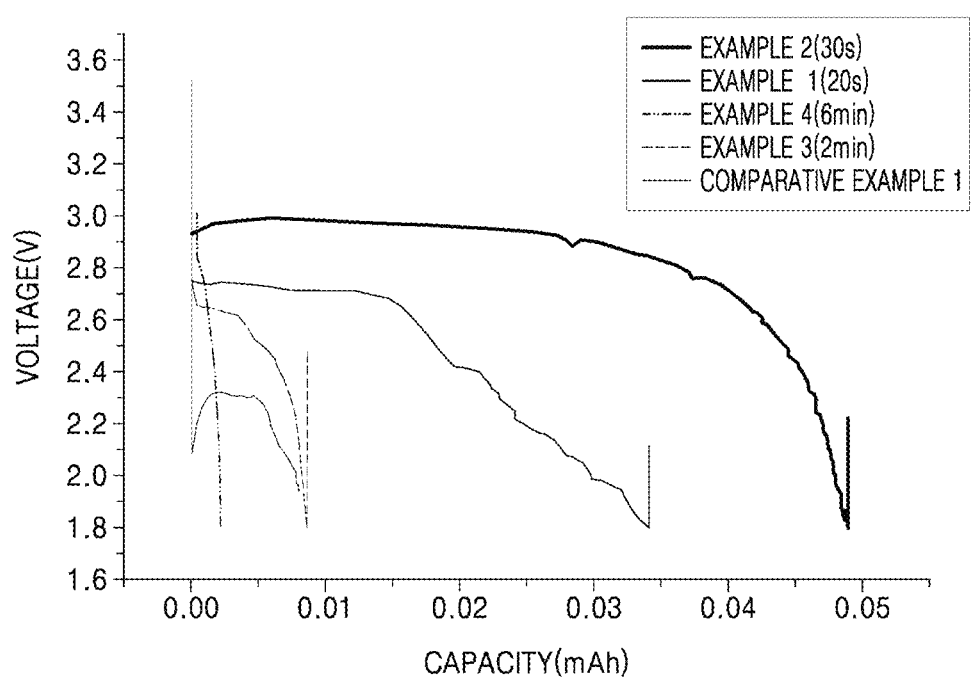
FIG. 2A is a graph of voltage (Volts, V) vs. capacity (milliampere-hours, mAh) illustrating discharge capacities of the lithium-air batteries of Examples 1 to 4 and Comparative Example 1.
Figure 2B:
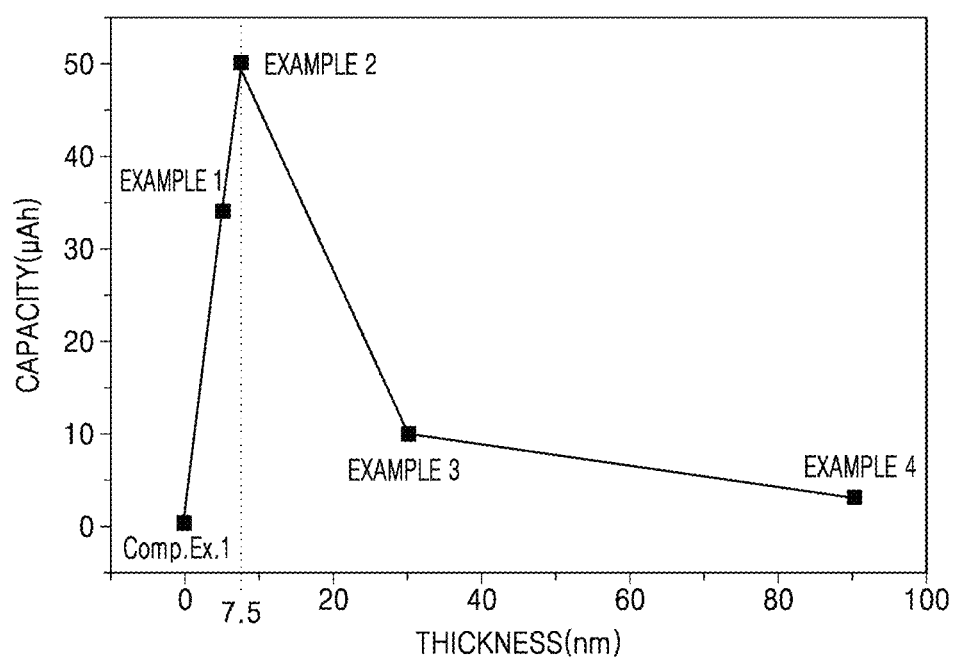
FIG. 2B is a graph of capacity (microampere-hours, µAh) vs. thickness (nanometers, nm) illustrating discharge capacities of lithium-air batteries of Examples 1 to 4 and Comparative Example 1.

Referring to FIGS. 2A and 2B, the lithium-air batteries of Examples 1 to 4 each having the Au conductive layer coated on the entire surface of the solid electrolyte layer were found to have improved discharge capacities, as compared with the lithium-air battery of Comparative Example b 1.

It was also found that when the Au conductive layer had a thickness of about 3 nm to about 100 nm, and in particular, about 3 nm to about 50 nm, the lithium-air battery had improved discharge capacity, with the highest discharge capacity at a thickness of about 7.5 nm.

Evaluation Example 2

After the lithium-air batteries manufactured in Example 1 and Comparative Example 2 were each discharged at about 60° C. under 1 atm of oxygen with a constant current of 0.01 mA/cm$^2$ until a voltage of 2.0 V (with respect to Li) was reached, discharge capacities and discharge capacities with respect to the cathodes were evaluated. The results are shown in FIG. 3.

Figure 3:
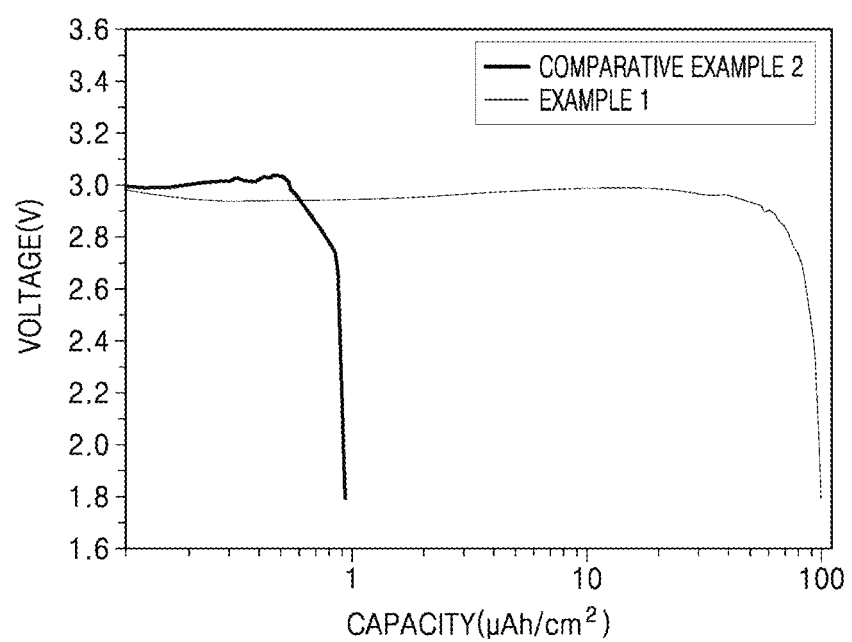
FIG. 3 is a graph of voltage (V) vs capacity (microampere-hours per square centimeter, $µAh/cm^2$) illustrating discharge capacities of the lithium-air battery of Example 1 and a lithium-air battery of Comparative Example 2.

Referring to FIG. 3, the lithium-air battery including pore-free cathode with the Au conductive layer according to Example 1 was found to have a remarkably improved discharge capacity, as compared with the lithium-air battery of Comparative Example 2 using the porous cathode.

Example 5

A polymer electrolyte as an anode intermediate layer was arranged on a lithium metal foil (having a thickness of about 10 mm, Ohara Corp., Japan) used as an anode. The polymer electrolyte was prepared by mixing polyethylene glycol dimethyl ether (PEGDME) (Mn=100,000 Daltons, Celgard) with lithium bis(trifluoromethylsulonly)imide (LiTFSI) used as a lithium salt in a molar ratio of PEGDME/LiTFSI of 20:1.

A lithium aluminum titanium phosphate (LATP) layer (having a thickness of about 20 mm, Ohara Corp., Japan) as a solid electrolyte layer was arranged on the polymer electrolyte.

A gold (Au) metal was coated on an entire surface of the solid electrolyte layer to a thickness of about 5 nm by sputtering to form a gold (Au) conductive layer of a cathode free of pores.

After a gas diffusion layer (GDL, 25BC, available from SGL) was arranged on the cathode, a nickel mesh was arranged on the gas diffusion layer, a resulting cell structure was pressed and fixed with a pressing member to allow transfer of air to the cathode, thereby manufacturing a lithium-air battery.

Figure 4A:
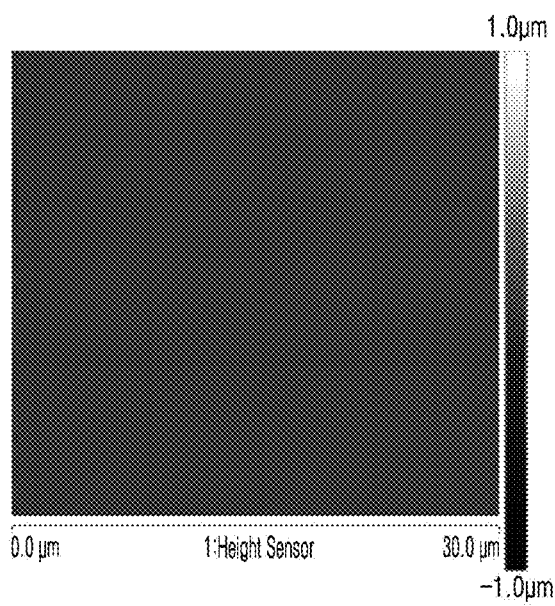
FIGS. 4A and 4B are atomic force microscope (AFM) images illustrating surface morphology of a gold (Au) conductive layer on a lithium aluminum titanium phosphate (LATP) electrolyte layer of a lithium-air battery of Example 5 before discharging.
Figure 4B:
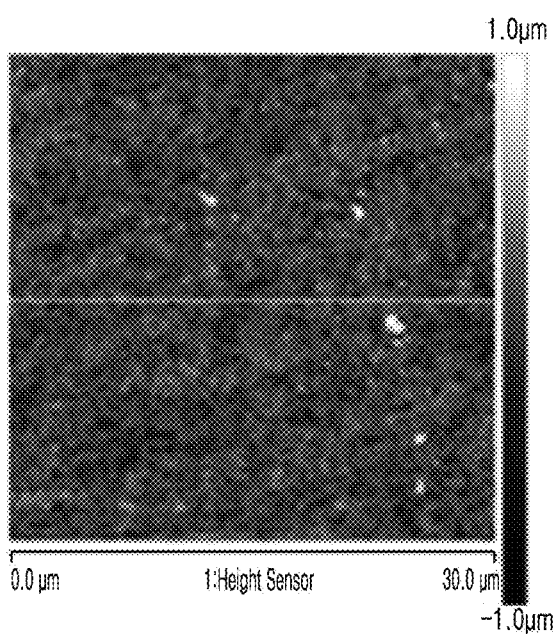
Figure 4C:
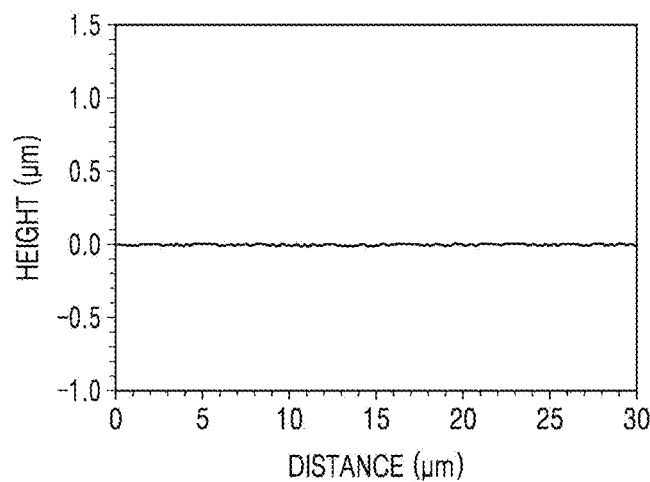
FIG. 4C is a line profile graph of height (micrometers, µm) vs. distance (µm) illustrating surface morphology of a gold (Au) conductive layer on a lithium aluminum titanium phosphate (LATP) electrolyte layer of a lithium-air battery of Example 5 before discharging.
Figure 4D:
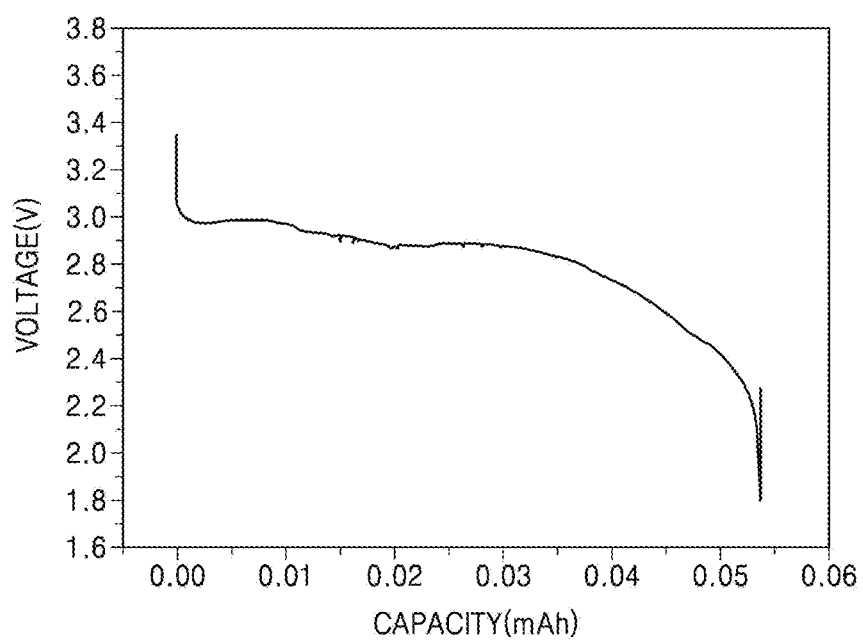
FIG. 4D is a graph of voltage (V) vs. capacity (mAh) illustrating discharge capacity in the lithium-air battery of Example 5 until a voltage of 1.8 Volt (V) was reached.

Evaluation Example 3: Comparison Before and after Discharge and Observation of Discharge Products Surface morphology of the Au conductive layer of the lithium-air battery manufactured in Example 5 before discharging was observed. The results are shown in FIGS. 4A to 4C. The lithium-air battery of Example 5 was also charged and discharged under the conditions, and a graph of discharge capacity in the lithium-air battery until a voltage of 1.8 V was reached is shown in FIG. 4D.

Figure 4E:
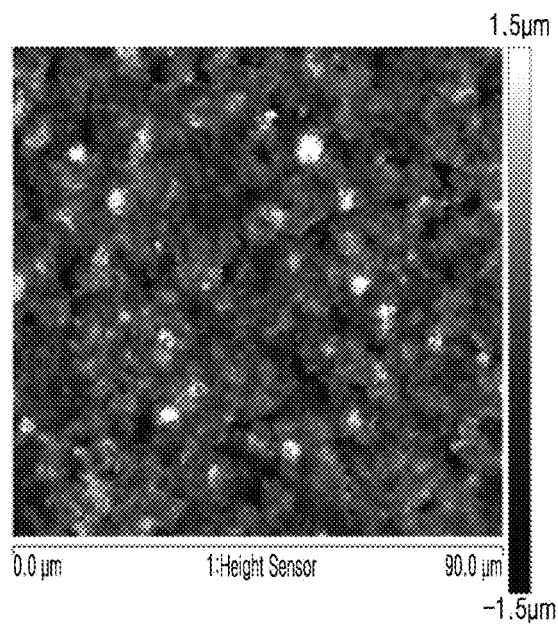
FIG. 4E illustrates an AFM image illustrating surface morphology of an Au conductive layer on a lithium aluminum titanium phosphate (LATP) electrolyte layer of the lithium-air battery of Example 5 after discharging.
Figure 4F:
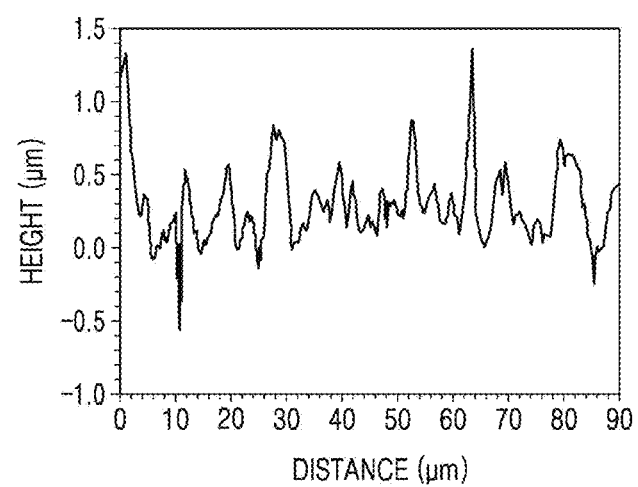
FIG. 4F is a line profile graph of height (µm) vs. distance (µm) illustrating surface morphology of a Au conductive layer on a lithium aluminum titanium phosphate (LATP) electrolyte layer of the lithium-air battery of Example 5 after discharging.
Figure 4G:
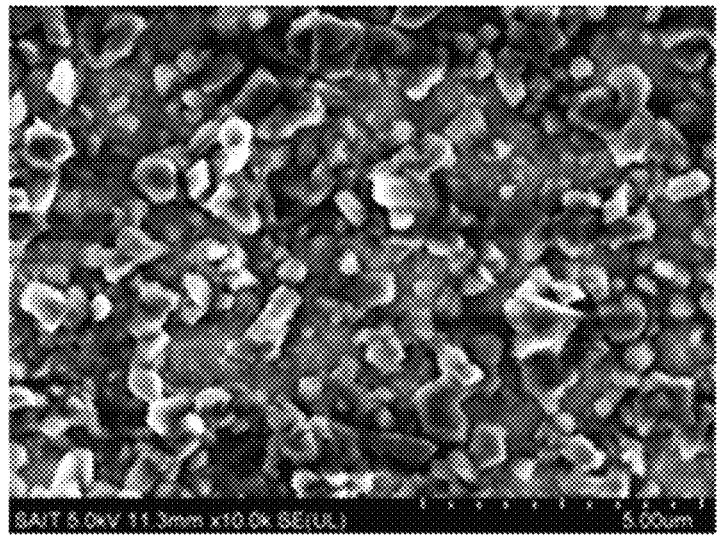
FIG. 4G is a scanning electron microscope (SEM) image illustrating distribution of discharge products on the entire surface of the Au conductive layer.

The surface morphology of the Au conductive layer of the lithium-air battery manufactured in Example 5 after discharging was observed. The results are shown in FIGS. 4E and 4F. A scanning electron microscope (SEM) image of the entire surface of the Au conductive layer is shown in FIG. 4G.

Referring to FIG. 4C, nearly no discharge product was generated before discharging, e.g., after charging. Referring to FIGS. 4E to 4G, it was found that discharge products were generated over the entire surface of the Au conductive layer after discharging.

Example 6

A polymer electrolyte as an anode intermediate layer was arranged on a lithium metal foil (having a thickness of about 10 mm, Ohara Corp., Japan) used as an anode. The polymer electrolyte was prepared by mixing polyethylene glycol dimethyl ether (PEGDME) (Mn=100,000 Daltons, Celgard) with lithium bis(trifluoromethylsulonly)imide (LiTFSI) used as a lithium salt in a molar ratio of PEGDME/LiTFSI of 20:1.

A lithium aluminum titanium phosphate (LATP) layer (having a thickness of about 20 mm, Ohara Corp., Japan) as a solid electrolyte layer was arranged on the polymer electrolyte.

A gold (Au) metal was coated on an entire surface of the solid electrolyte layer to a thickness of about 5 nm by sputtering to form an Au conductive layer of a cathode free of pores.

After a gas diffusion layer (GDL, 25BC, available from SGL) was arranged on the cathode, and then a nickel mesh was arranged on the gas diffusion layer, a resulting cell structure was pressed and fixed with a pressing member to allow transfer of air to the cathode, thereby manufacturing a lithium-air battery.

After discharging the lithium-air battery of Example 6 under moisture-containing $O_2$ conditions, the layers of discharge product/conductive layer/solid electrolyte layer were observed by transmission electron microscopy (TEM). The resulting TEM image is shown in FIG. 5.

Figure 5:
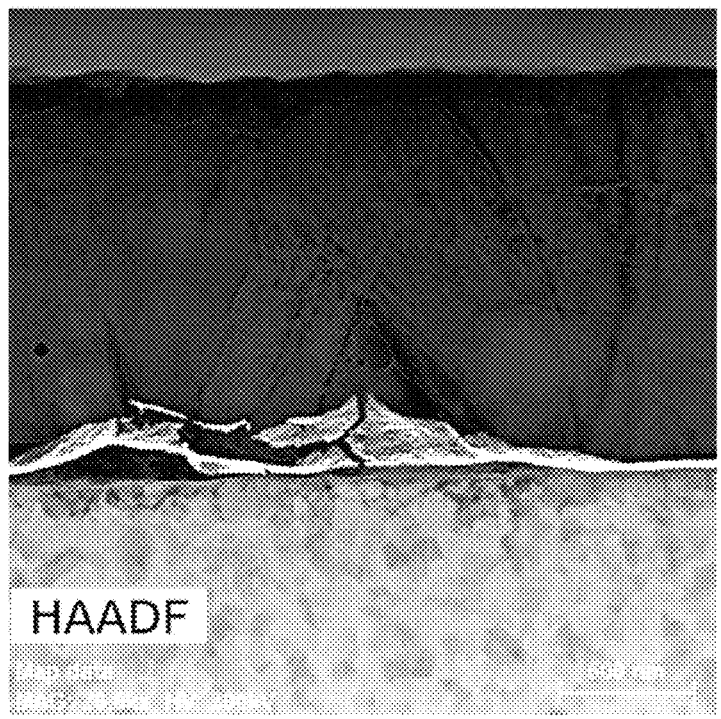
FIG. 5 is a transmission electron microscope (TEM) image illustrating distribution of discharge products on the entire surface of an Au—Pt cathode on an LATP electrolyte layer of a lithium-air battery of Example 6.

Referring to FIG. 5, it was found that the discharge product was distributed on the entire surface of the Au—Pt cathode on the LATP layer.

Example 7

A polymer electrolyte as an anode intermediate layer was arranged on a lithium metal foil (having a thickness of about 10 mm, Ohara Corp., Japan) used as an anode. The polymer electrolyte was prepared by mixing polyethylene glycol dimethyl ether (PEGDME) (Mn=100,000 Daltons, Celgard) with lithium bis(trifluoromethylsulonly)imide (LiTFSI) used as a lithium salt in a molar ratio of PEGDME/LiTFSI of 20:1.

A lithium aluminum titanium phosphate (LATP) layer (having a thickness of about 20 mm, Ohara Corp., Japan) as a solid electrolyte layer was arranged on the polymer electrolyte.

A gold (Au) metal was coated on an entire surface of the solid electrolyte layer to a thickness of about 5 nm by sputtering to form an Au conductive layer of a cathode free of pores.

After a gas diffusion layer (GDL, 25BC, available from SGL) was arranged on the cathode, and then a nickel mesh was arranged on the gas diffusion layer, a resulting cell structure was pressed and fixed with a pressing member to allow transfer of air to the cathode, thereby manufacturing a lithium-air battery.

Evaluation Example 4: Observation of Components and Location of Discharge Products After discharging the lithium-air battery of Example 7 under moisture-containing, $O_2$ conditions, resulting discharge products were observed using Fourier-transform infrared spectroscopy (FT-IR) mapping. The results are shown in FIGS. 6A to 6D.

Figure 6A:
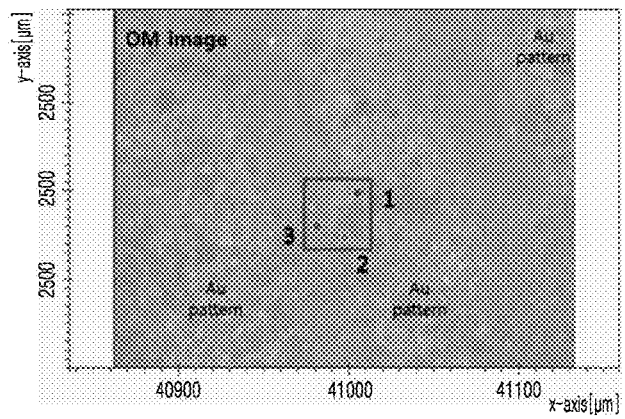
FIG. 6A is a Fourier-transform infrared spectroscopy (FT-IR) map showing locations of discharge products generated in a lithium-air battery of Example 7 during discharge.
Figure 6B:
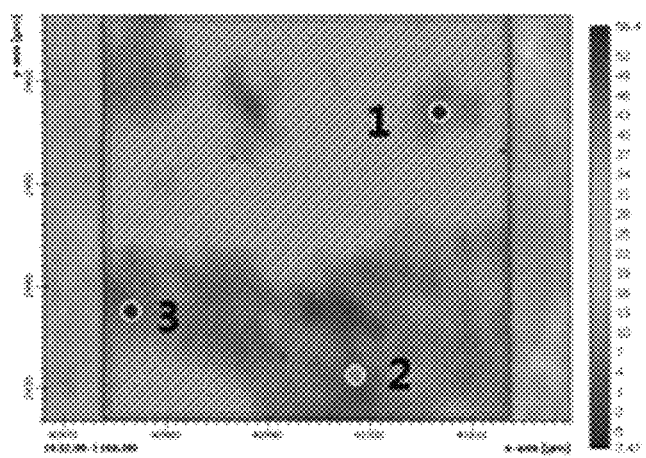
FIG. 6B is a FT-IR map of carbonate showing the location of carbonate discharge products generated in a lithium-air battery of Example 7 during discharge.
Figure 6C:
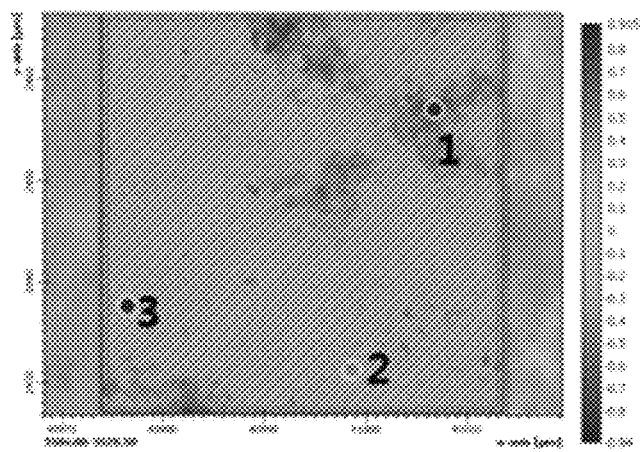
FIG. 6C is a FT-IR map of hydroxy (O—H) showing the location of hydroxy discharge products generated in a lithium-air battery of Example 7 during discharge.
Figure 6D:
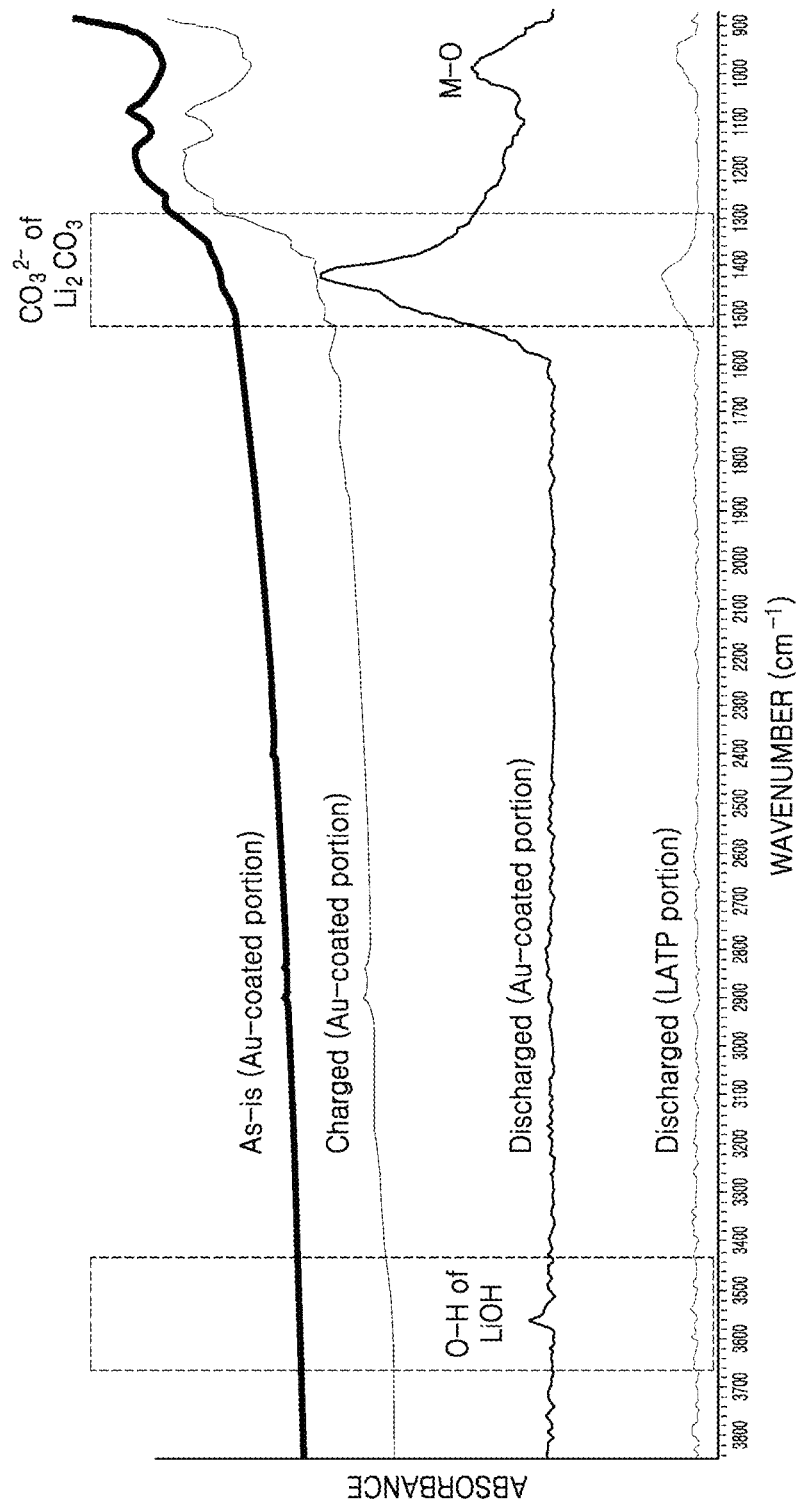
FIG. 6D is a graph of absorbance (arbitrary units, a. u.) vs. wavenumber (reciprocal centimeters, $cm^{-1}$) illustrating IR spectra of the Au conductive layer of the lithium-air battery of Example 7 after discharge.

Referring to FIGS. 6A to 6C, components of the discharge products were observed on the Au-coated portion (i.e., Au conductive layer). Referring to FIG. 6D, the discharge products were found to include $Li_2O_2$, $Li_2CO_3$, and LiOH.

These results indicate that discharge products were formed at the two-phase interface of the cathode (e.g., Au conductive layer) and oxygen, not the three-phase interface of the solid electrolyte, cathode, and oxygen.

Evaluation Example 5: Charge and Discharge Test

Figure 7A:
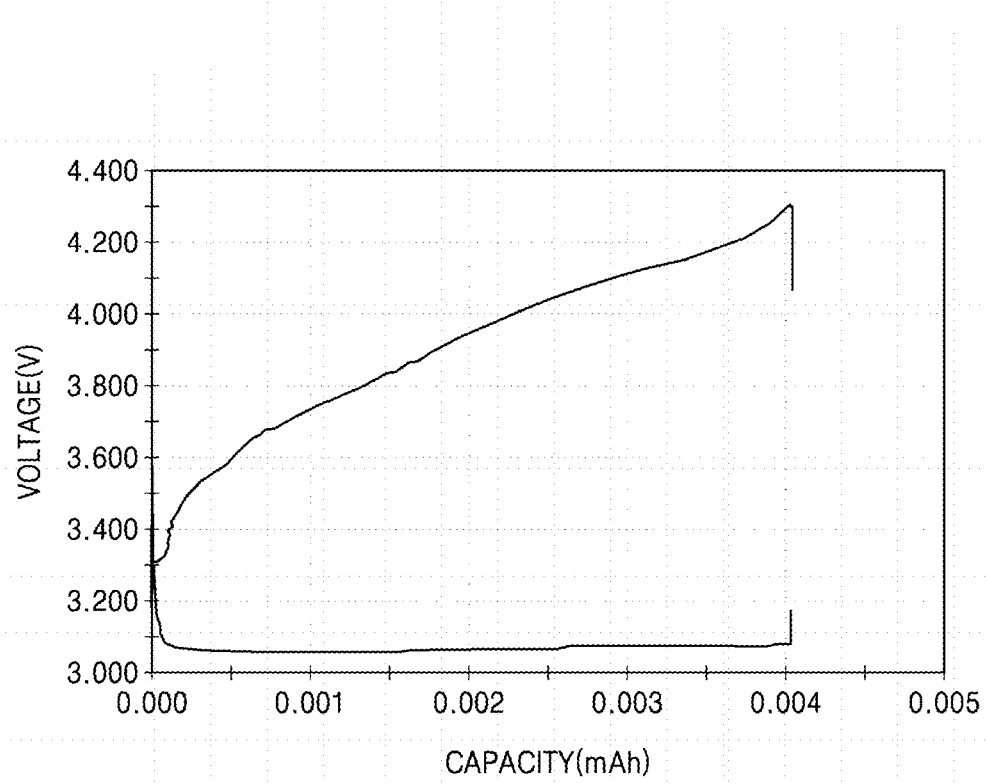
FIG. 7A is a graph of voltage (V) vs. capacity (mAh) illustrating a charge and discharge test result of the lithium-air battery of Example 7 at a cutoff capacity of 0.004 mAh.
Figure 7B:
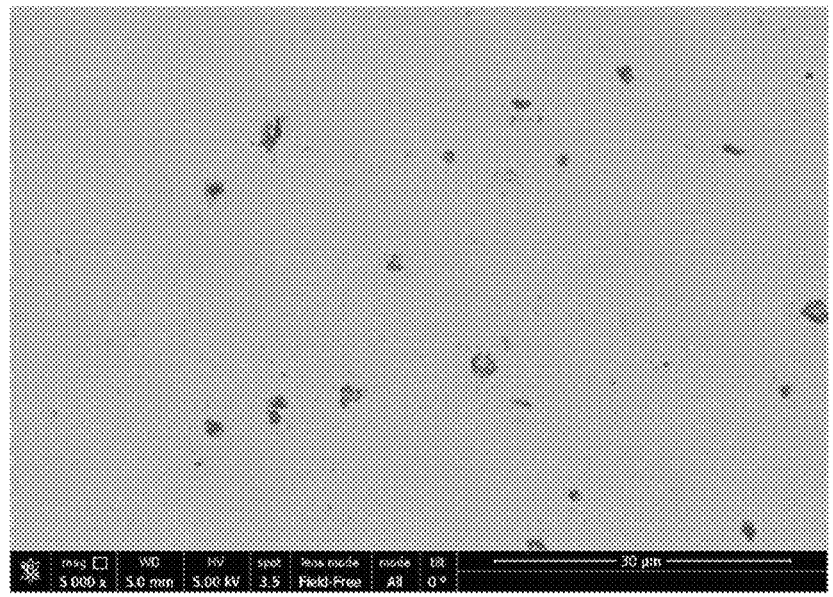
FIGS. 7B and 7C are SEM images showing that discharge products disappeared after charging of the lithium-air battery of Example 7.
Figure 7C:
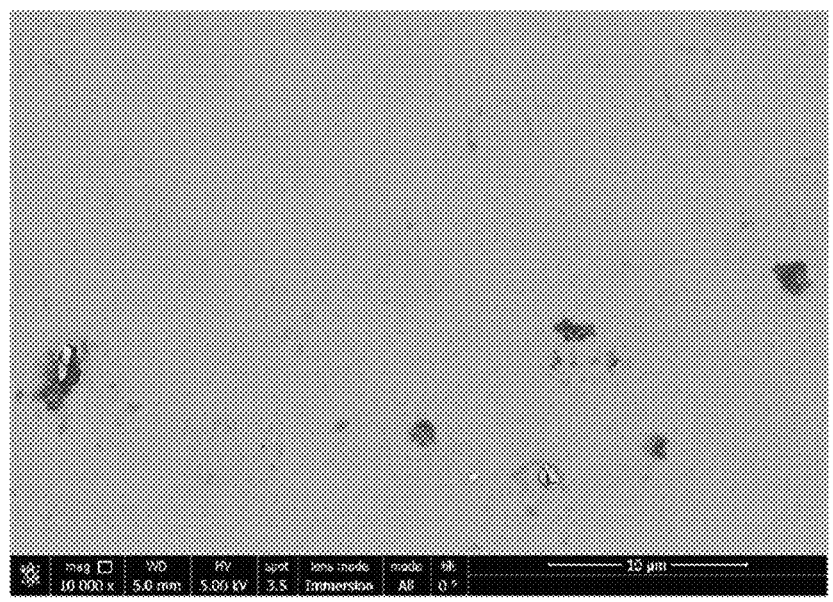
Figure 7D:
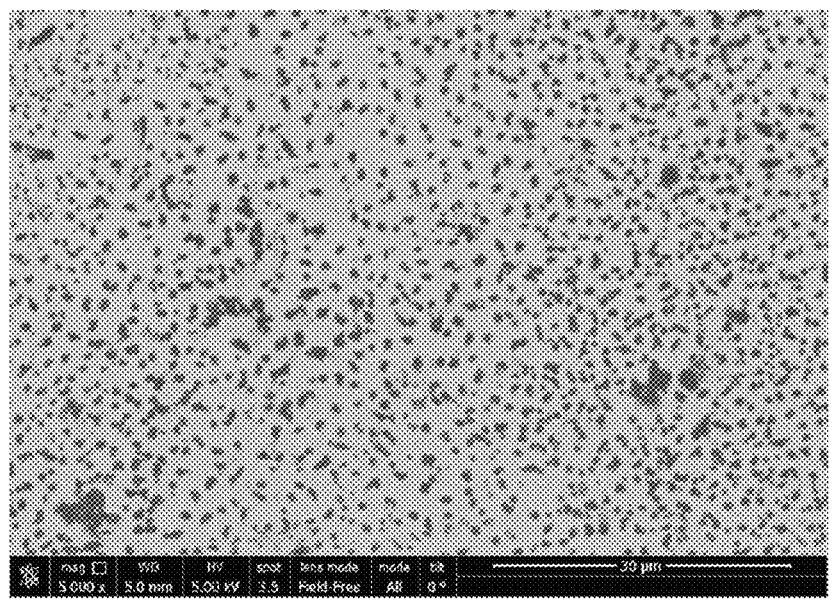
FIGS. 7D and 7E are SEM images showing discharge products generated after discharging of the lithium-air battery of Example 7.
Figure 7E:
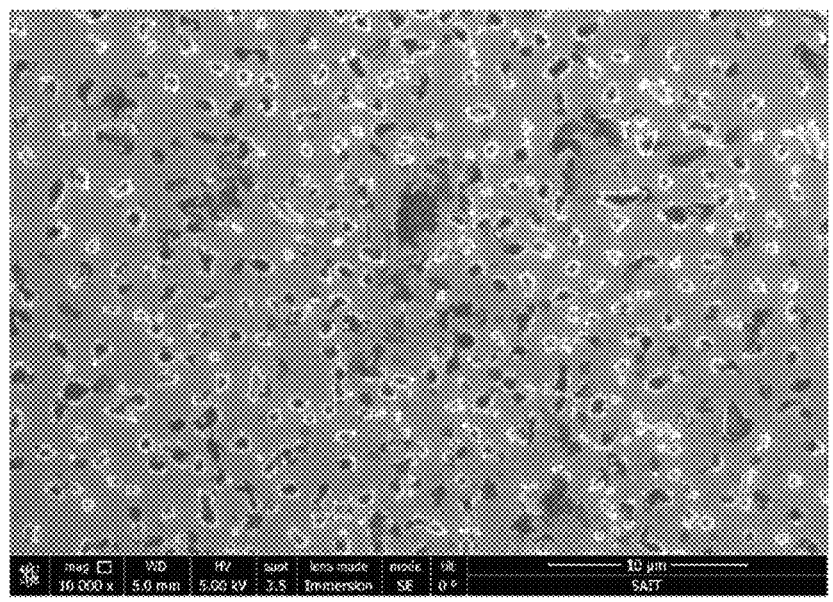
Figure 7F:
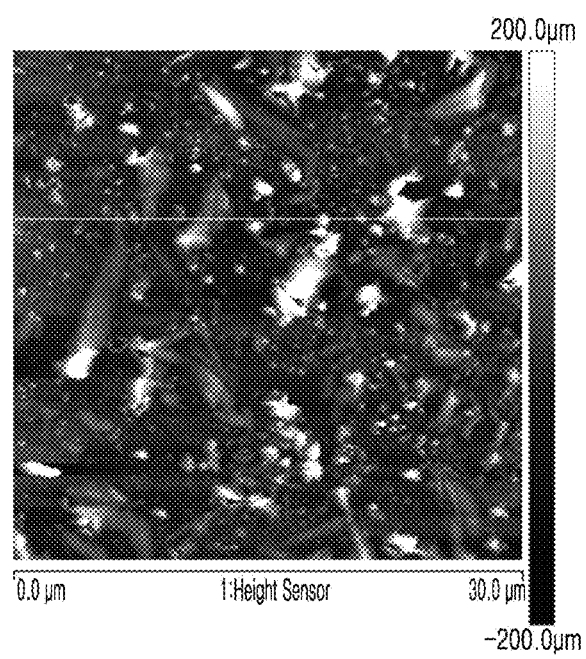
FIG. 7F is an AFM image of the surface of the lithium-air battery of Example 7 after discharge.
Figure 7G:
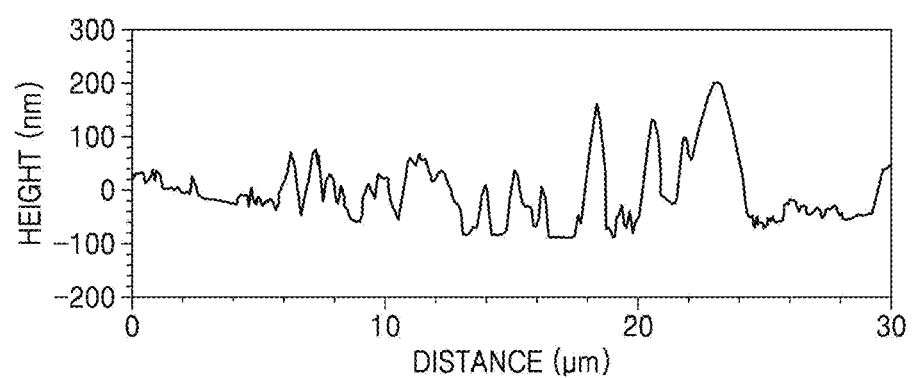
FIG. 7G is a graph of height (nm) vs. distance (μm) illustrating a height distribution of the discharge products on a surface of the lithium-air battery of Example 7.

After discharging the lithium-air battery of Example 7 under moisture-containing, $O_2$ conditions, the lithium-air battery with the discharge products (an average thickness of about 30 nm) was charged and discharged under 4 V cutoff conditions to evaluate charge and discharge characteristics. The results are shown in FIG. 7A. Scanning electron microscope (SEM) images of the discharge products after the charging are shown in FIGS. 7B and 7C, and after discharging are shown in FIGS. 7D and 7E. An atomic force microscope (AFM) image of the discharge products is shown in FIG. 7F. FIG. 7G is a graph showing a height distribution of the discharge products.

Referring to FIG. 7A, the lithium-air battery of Example 7 was found to be discharged at about 3.1 V and charged at about 3.8 V. Referring to FIGS. 7B and 7C, discharge products generated after discharging completely disappeared after charging. Referring to FIGS. 7D and 7E, discharge products were found after discharging. Referring to FIGS. 7F and 7G, the discharge products were found to have a size of several micrometers and a height of hundreds of nanometers.

Evaluation Example 6: Evaluation of Cycle Characteristics

After the lithium-air battery of Example 7 was discharged under 60° C., 1 atm of oxygen with a constant current of 0.01 mA/cm$^2$ until a voltage of 3.0 V (with respect to Li) was reached (an average discharge product thickness of about 4 nm), the lithium-air battery was charged with the same current until a voltage of about 4.2 V was reached. This cycle was repeated 330 times. A charge and discharge graph illustrating the resulting cycle characteristics is shown in FIG. 8

Figure 8:
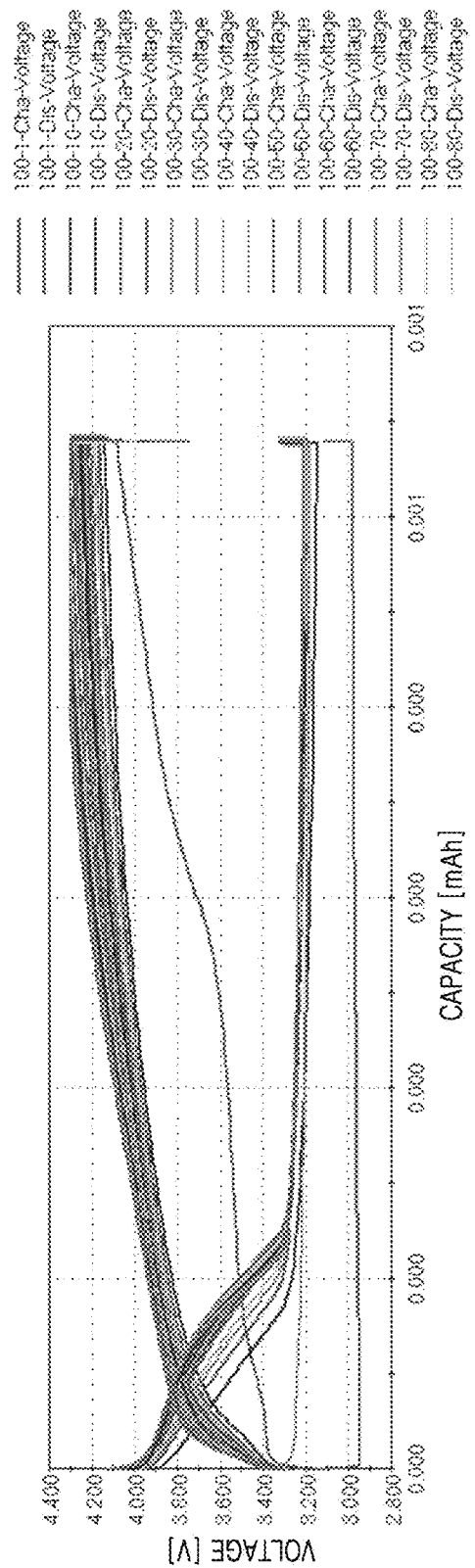
FIG. 8 is a graph of voltage (V) vs. capacity (mAh) illustrating cycle characteristics of the lithium-air battery of Example 7 at a cutoff capacity of 0.001 mAh.

Referring to FIG. 8, the lithium-air battery of Example 7 using the cathode according to an embodiment was found to have improved cycle characteristics.

Example 8

A lithium-air battery was manufactured in the same manner as in Example 1, except that platinum (Pt) metal was used instead of the Au metal.

Evaluation Example 7: Charge and Discharge Test

The lithium-air batteries of Examples 1 and 8 were each charged and discharged under 1.8 V cutoff conditions to evaluate charge and charge characteristics. The results are shown in FIG. 9.

Figure 9:
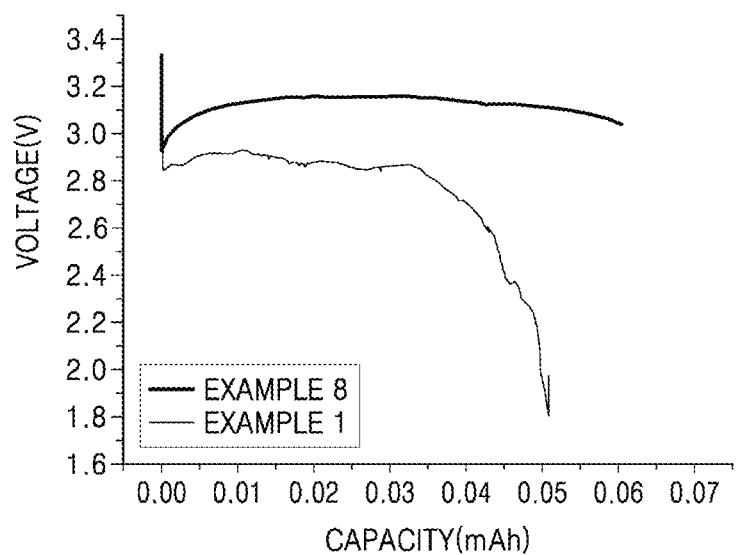
FIG. 9 is a graph of voltage (V) vs. capacity (mAh) illustrating results of a charge and discharge test on the lithium air-battery of Example 1 and a lithium-air battery of Example 8 at a cutoff capacity, respectively.

Referring to FIG. 9, the lithium-air batteries of Examples 1 and 8 each using a different metal in the cathode were found to operate normally, but with a relatively low overpotential applied in the Pt metal cathode, as compared with the Au metal cathode.

As described above, by inclusion of a cathode free of pores, a lithium-air battery may have improved discharge capacity and lifetime characteristics.

It should be understood that embodiments described herein should be considered in a descriptive sense only and not for purposes of limitation. Descriptions of features or aspects within each embodiment should typically be considered as available for other similar features or aspects in other embodiments.

While an embodiment may have been described with reference to the figures, it will be understood by those of ordinary skill in the art that various changes in form and details may be made therein without departing from the spirit and scope as defined by the following claims.

What is claimed is:

1. A cathode configured to use oxygen as a cathode active material, the cathode comprising:
   a conductive layer comprising an electronic conductor, wherein the conductive layer is free of pores, and wherein the electronic conductor has a lithium ion conductivity; and
   a solid electrolyte directly on the conductive layer.

2. The cathode of claim 1, wherein the electronic conductor has an electronic conductivity of about $1.0 \times 10^{-4}$ S/cm or greater.

3. The cathode of claim 1, wherein the electronic conductor has an ionic conductivity of about $1.0 \times 10^{-4}$ S/cm or greater.

4. The cathode of claim 1, wherein the electronic conductor comprises a metal, a metal oxide, and a mixture thereof.

5. The cathode of claim 1, wherein the electronic conductor comprises at least one of Ni, Pd, Pb, Fe, Ir, Co, Rh, Mn, Cr, Ru, Re, Sn, V, Ge, W, Zr, Ti, Mo, Hf, U, Nb, Th, Ta, Bi, Na, K, Rb, Cs, Ca, Sr, Ba, Y, La, Ce, Pr, Nd, Pm, Sm, Gd, Tb, Dy, Ho, Er, Mg, Al, Si, Sc, Zn, Ga, Rb, Ag, Cd, In, Sb, Pt, Au, or Pb, and oxides thereof.

6. The cathode of claim 4, wherein the electronic conductor further comprises lithium.

7. The cathode of claim 1, wherein the conductive layer has a thickness of about 3 nm to about 100 nm.

8. The cathode of claim 1, further comprising at least one of $Li_2O_2$, LiOH, $Li_2CO_3$, or $Li_2O$ on a surface of the conductive layer.

9. A lithium-air battery comprising:
   an anode comprising lithium or a lithium alloy;
   a solid electrolyte on the anode; and
   a cathode on the solid electrolyte, the cathode configured to use oxygen as a cathode active material, the cathode comprising
      a conductive layer comprising an electronic conductor, wherein the conductive layer is free of pores, and wherein the electronic conductor has lithium ion conductivity; and
   a solid electrolyte directly on the conductive layer.

10. The lithium-air battery of claim 9, wherein the electronic conductor is disposed on an entire surface of the solid electrolyte.

11. The lithium-air battery of claim 9, further comprising a discharge product on a surface of the cathode, wherein the discharge product comprises at least one of $Li_2O_2$, LiOH, $Li_2CO_3$, or $Li_2O$.

12. The lithium-air battery of claim 11, wherein an area of the surface of the cathode on which the discharge product is disposed is about 90 percent to 100 percent of a total surface area of the cathode.

13. The lithium-air battery of claim 9, wherein, after discharging and charging the lithium-air battery, a discharge product is not present on a surface of the cathode.

14. The lithium-air battery of claim 13, wherein the discharge product comprises at least one of a lithium oxide, a lithium peroxide, a lithium hydroxide, or a lithium carbonate.

15. The lithium-air battery of claim 13, wherein the discharge product is at least one of $Li_2O_2$, LiOH, $Li_2CO_3$, or $Li_2O$.

16. The lithium-air battery of claim 9, wherein an amount of the conductive layer is about 1 part by weight to about 100 parts by weight, with respect to 100 parts by weight of a total weight of the cathode.

17. The lithium-air battery of claim 9, wherein the solid electrolyte comprises at least one of a lithium-ion conducting glass, a crystalline lithium-ion conducting ceramic, or a crystalline lithium-ion conducting glass-ceramic.

18. The lithium-air battery of claim 9, wherein the solid electrolyte comprises at least one of a lithium-aluminum-germanium-phosphate, a lithium-aluminum-titanium-phosphate, or a lithium-aluminum-titanium-silicon-phosphate.

19. A method of manufacturing a lithium-air battery, the method comprising:
   disposing a solid electrolyte layer on an anode comprising lithium or a lithium alloy; and
   coating an electronic conductor directly on a surface of the solid electrolyte layer opposite the anode to form a conductive layer free of pores to form a cathode configured to use oxygen as a cathode active material to manufacture the lithium-air battery, wherein the electronic conductor has a lithium ion conductivity; and the solid electrolyte is on the conductive layer.

* * * * *